United States Patent
Kook et al.

(10) Patent No.: US 10,260,602 B2
(45) Date of Patent: Apr. 16, 2019

(54) VEHICULAR MULTI-STAGE TRANSMISSION

(71) Applicants: Hyundai Motor Company, Seoul (KR); Kia Motors Corporation, Seoul (KR)

(72) Inventors: Jae Chang Kook, Gyeonggi-do (KR); Hyun Sik Kwon, Seoul (KR); Ki Tae Kim, Incheon (KR); Won Min Cho, Gyeonggi-do (KR); Seong Wook Hwang, Gyeonggi-do (KR); Seong Wook Ji, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/824,430

(22) Filed: Nov. 28, 2017

(65) Prior Publication Data

US 2019/0056015 A1 Feb. 21, 2019

(30) Foreign Application Priority Data

Aug. 18, 2017 (KR) .................. 10-2017-0104768

(51) Int. Cl.
*F16H 3/66* (2006.01)
(52) U.S. Cl.
CPC ..... *F16H 3/663* (2013.01); *F16H 2200/0078* (2013.01); *F16H 2200/2015* (2013.01); *F16H 2200/2023* (2013.01); *F16H 2200/2046* (2013.01)

(58) Field of Classification Search
None
See application file for complete search history.

(56) References Cited

U.S. PATENT DOCUMENTS

| 3,267,769 | A   | * | 8/1966  | Tuck ........................ F16H 3/66 475/276 |
| 2013/0260945 | A1 | * | 10/2013 | Fellmann ................. F16H 3/66 475/275 |
| 2014/0004991 | A1 | * | 1/2014  | Koch ........................ F16H 3/66 475/276 |
| 2016/0109006 | A1 | * | 4/2016  | Schoolcraft ............. F16H 15/52 475/185 |
| 2018/0328461 | A1 | * | 11/2018 | Kim ......................... F16H 3/66 |
| 2018/0328468 | A1 | * | 11/2018 | Kim ......................... F16H 3/66 |
| 2018/0328469 | A1 | * | 11/2018 | Kim ......................... F16H 3/663 |

FOREIGN PATENT DOCUMENTS

KR 2013-0003981 A 1/2013

* cited by examiner

*Primary Examiner* — Justin Holmes
(74) *Attorney, Agent, or Firm* — Mintz Levin Cohn Ferris Glovsky and Popeo, P.C.; Peter F. Corless

(57) ABSTRACT

A vehicular multi-stage transmission is provided. In particular, the transmission includes an input shaft and an output shaft. A first planetary gear set, a second planetary gear set, a third planetary gear set, a fourth planetary gear set, and a fifth planetary gear set (PG5) are provided and each is disposed between the input shaft and the output shaft to transfer a rotational force and has three rotation elements. Additionally, at least six gear-shifting elements are connected to the rotation elements of the planetary gear sets.

7 Claims, 3 Drawing Sheets

FIG. 3

| GEAR | CL1 | CL2 | CL3 | CL4 | B1 | B2 | GEAR RATIO |
|------|-----|-----|-----|-----|----|----|------------|
| 1 | ● | | | ● | ● | ● | 5.400 |
| 2 | ● | | ● | | ● | ● | 4.860 |
| 3 | ● | ● | | | ● | ● | 4.719 |
| 4 | | ● | ● | | ● | ● | 3.117 |
| 5 | ● | ● | ● | | | ● | 2.096 |
| 6 | | ● | ● | ● | | ● | 1.704 |
| 7 | ● | ● | | ● | | ● | 1.507 |
| 8 | ● | | ● | ● | | ● | 1.264 |
| 9 | ● | ● | ● | ● | | | 1.000 |
| 10 | ● | | ● | ● | ● | | 0.847 |
| 11 | ● | ● | | ● | ● | | 0.676 |
| 12 | | ● | ● | ● | ● | | 0.630 |
| REV. | | | ● | ● | ● | ● | −5.610 |

VEHICULAR MULTI-STAGE TRANSMISSION

CROSS REFERENCE TO RELATED APPLICATION

The present application claims priority to Korean Patent Application No. 10-2017-0104768, filed on Aug. 18, 2017, the entire contents of which is incorporated herein for all purposes by this reference.

TECHNICAL FIELD

The present disclosure relates to a vehicular multi-stage transmission and, more specifically, to a technology for implementing a maximum number gear-shifting stages using minimal components and a simplified configuration to improve fuel efficiency of a vehicle.

BACKGROUND

The recent rise in oil prices has resulted in extreme competition among global automakers for improving fuel efficiency. For an engine, the automakers are making an effort to reduce the weight of the engine and improve fuel efficiency thereof by a downsizing technology or the like. Meanwhile, fuel efficiency improvements methods, for example using a transmission mounted in a vehicle, include a method for allowing an engine to be operated at a more efficient operation point through multi-staging of a transmission to ultimately improve fuel efficiency. Further, the multi-staging of the transmission, as described above, enables an engine to be operated at a relatively low revolutions per minute (RPM) band, thereby substantially reducing the noise of a vehicle.

However, as the number of gear-shifting stages of a transmission increases, the number of internal components included in the transmission increases and thus the mountability, production costs, weight, and transmission efficiency of the transmission decrease. Therefore, to maximize a fuel efficiency improvement effect through the multi-staging of the transmission, it may be important to design a transmission structure capable of deriving maximum efficiency by using a minimal number of components and a comparatively simplified configuration.

The above information disclosed in this section is merely for enhancement of understanding of the background of the present disclosure and should not be taken as acknowledgement that this information forms the prior art that is already known to a person skilled in the art.

SUMMARY

The present disclosure has been proposed to solve the above-described problems, and an aspect of the present disclosure is to provide a vehicular multi-stage transmission, which has a maximum number of gear-shifting stages implemented using minimal components and a simplified configuration thereof to improve fuel efficiency of a vehicle.

In accordance with an aspect of the present disclosure, a vehicular multi-stage transmission according to the present disclosure may include: an input shaft (IN) and an output shaft (OUT); a first planetary gear set (PG1), a second planetary gear set (PG2), a third planetary gear set (PG3), a fourth planetary gear set (PG4), and a fifth planetary gear set (PG5), each of which may be disposed between the input shaft (IN) and the output shaft (OUT) to transfer a rotational force and has three rotation elements; and six gear-shifting elements connected to the rotation elements of the planetary gear sets.

A first rotation element of the first planetary gear set (PG1) may be fixedly connected to a first rotation element of the second planetary gear set (PG2) and be selectively connected to a transmission case (CS) by one of the gear-shifting elements, a second rotation element of the first planetary gear set (PG1) may be fixedly connected to a third rotation element of the fifth planetary gear set (PG5), and a third rotation element of the first planetary gear set (PG1) may be selectively connected to the transmission case (CS) by another of the gear-shifting elements; a second rotation element of the second planetary gear set (PG2) may be fixedly connected to the input shaft (IN) and selectively connected to a third rotation element of the third planetary gear set (PG3), and a third rotation element of the second planetary gear set (PG2) may be selectively connected to each of a first rotation element and a second rotation element of the third planetary gear set (PG3); a first rotation element of the third planetary gear set (PG3) may be fixedly connected to a first rotation element of the fourth planetary gear set (PG4), and the second rotation element of the third planetary gear set (PG3) may be fixedly connected to a second rotation element of the fourth planetary gear set (PG4) and selectively connected to the third rotation element of the fifth planetary gear set (PG5); a third rotation element of the fourth planetary gear set (PG4) may be fixedly connected to a first rotation element of the fifth planetary gear set (PG5); and a second rotation element of the fifth planetary gear set (PG5) may be connected to the output shaft (OUT).

The first rotation element of the first planetary gear set (PG1) may be selectively connected to the transmission case (CS) by a first brake (B1) among the gear-shifting elements. The third rotation element of the first planetary gear set (PG1) may be selectively connected to the transmission case (CS) by a second brake (B2) among the gear-shifting elements. The remaining elements among the gear-shifting elements may be arranged to form a variable connection structure between the rotation elements of the planetary gear sets.

A first clutch (CL1) among the gear-shifting elements may be installed to form a variable connection structure between the second rotation element of the second planetary gear set (PG2) and the third rotation element of the third planetary gear set (PG3). A second clutch (CL2) among the gear-shifting elements may be installed to form a variable connection structure between the third rotation element of the second planetary gear set (PG2) and the second rotation element of the third planetary gear set (PG3). A third clutch (CL3) among the gear-shifting elements may be installed to form a variable connection structure between the third rotation element of the second planetary gear set (PG2) and the first rotation element of the third planetary gear set (PG3). A fourth clutch (CL4) among the gear-shifting elements may be installed to form a variable connection structure between the second rotation element of the third planetary gear set (PG3) and the third rotation element of the fifth planetary gear set (PG5). The third planetary gear set (PG3) and the fourth planetary gear set (PG4) may be arranged as a single complex planetary gear set having four rotation elements.

Further, a vehicular multi-stage transmission of the present disclosure may include: a first planetary gear set (PG1), a second planetary gear set (PG2), a third planetary gear set (PG3), a fourth planetary gear set (PG4), and a fifth planetary gear set (PG5), each of which has three rotation elements; six gear-shifting elements configured to selectively provide a frictional force; and ten rotational shafts connected to the rotation elements of the planetary gear sets. A first rotational shaft (A1) may be directly connected (e.g., connected in series) to a first rotation element of the first planetary gear set (PG1) and a first rotation element of the second planetary gear set (PG2), a second rotational shaft (A2) may be directly connected to a second rotation element of the first planetary gear set (PG1) and a third rotation element of the fifth planetary gear set (PG5), a third rotational shaft (A3) may be directly connected to a third rotation element of the first planetary gear set (PG1), a fourth rotational shaft (A4) may be an input shaft (IN) directly connected to a second rotation element of the second planetary gear set (PG2), a fifth rotational shaft (A5) may be directly connected to a third rotation element of the second planetary gear set (PG2), a sixth rotational shaft (A6) may be directly connected to a first rotation element of the third planetary gear set (PG3) and a first rotation element of the fourth planetary gear set (PG4), a seventh rotational shaft (A7) may be directly connected to a second rotation element of the third planetary gear set (PG3) and a second rotation element of the fourth planetary gear set (PG4), an eighth rotational shaft (A8) may be directly connected to a third rotation element of the third planetary gear set (PG3), a ninth rotational shaft (A9) may be directly connected to a third rotation element of the fourth planetary gear set (PG4) and a first rotation element of the fifth planetary gear set (PG5), a tenth rotational shaft (A10) is an output shaft (OUT) directly connected to a second rotation element of the fifth planetary gear set (PG5).

Additionally, a first clutch (CL1) among the six gear-shifting elements may be installed between the fourth rotational shaft (A4) and the eighth rotational shaft (A8), a second clutch (CL2) may be installed between the fifth rotational shaft (A5) and the seventh rotational shaft (A7), a third clutch (CL3) may be installed between the fifth rotational shaft (A5) and the sixth rotational shaft (A6), a fourth clutch (CL4) may be installed between the second rotational shaft (A2) and the seventh rotational shaft (A7), a first brake (B1) may be installed between the first rotational shaft (A1) and the transmission case (CS), and a second brake (B2) may be installed between the third rotational shaft (A3) and the transmission case (CS).

The first clutch (CL1) may be installed to selectively connect the second rotation element of the second planetary gear set (PG2) and the third rotation element of the third planetary gear set (PG3). The second clutch (CL2) is installed to may be selectively connect the third rotation element of the second planetary gear set (PG2) and the second rotation element of the third planetary gear set (PG3). The third clutch (CL3) may be installed to selectively connect the third rotation element of the second planetary gear set (PG2) and the first rotation element of the third planetary gear set (PG3). The fourth clutch (CL4) may be installed to selectively connect the second rotation element of the third planetary gear set (PG3) and the third rotation element of the fifth planetary gear set (PG5). The third planetary gear set (PG3) and the fourth planetary gear set (PG4) may be arranged as a single complex planetary gear set having four rotation elements.

A vehicular multi-stage transmission made in a structure as described above may change the speed and direction of rotation of rotation elements, which configure five planetary gear sets, through a selective control operation of a clutch and a brake, to perform gear shifting. Therefore, the vehicular multi-stage transmission is capable of having a gear ratio of twelve forward stages and one reverse stage, implemented through the above-described gear shifting operation, to allow a vehicle to operate. Further, a combination of three planetary gear sets and one complex planetary gear set allows the vehicular multi-stage transmission to have a gear ratio of twelve forward stages and one reverse stage, thus reducing the volume package of an automatic transmission. Therefore, the vehicular multi-stage transmission is capable of improving fuel efficiency by multi-staging the gear shifting stage of an automatic transmission and enhancing the quiet operation of a vehicle using an engine operation point at a low RPM band.

BRIEF DESCRIPTION OF THE DRAWINGS

The above and other aspects, features and advantages of the present disclosure will be more apparent from the following detailed description taken in conjunction with the accompanying drawings, in which:

FIG. 3 is an operation mode table of the vehicular multi-stage transmission according to an exemplary embodiment of the present disclosure.

DETAILED DESCRIPTION

It is understood that the tem) "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
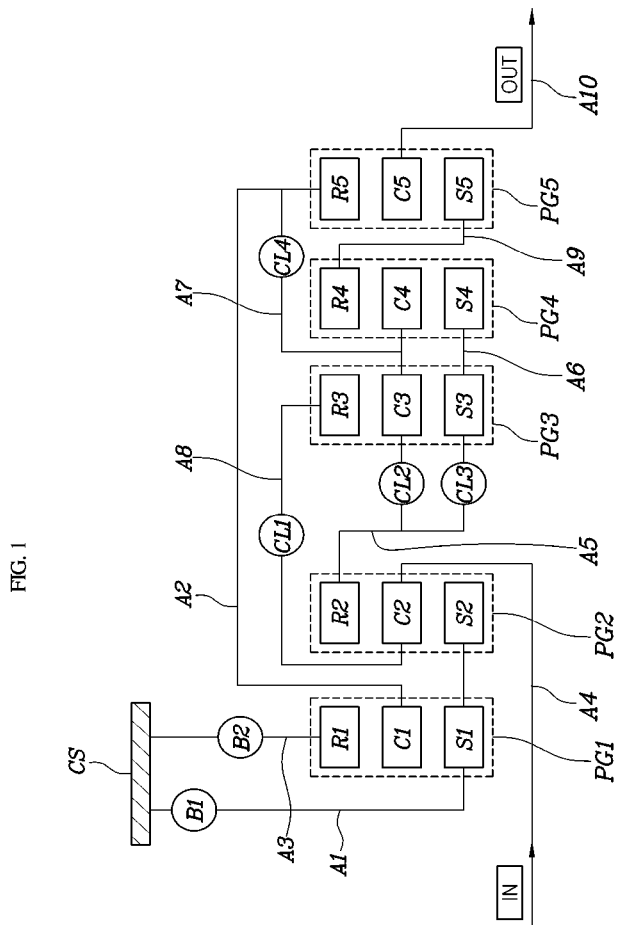
FIG. 1 schematically illustrates a structure of a vehicular multi-stage transmission according to an exemplary embodiment of the present disclosure.
Figure 2:
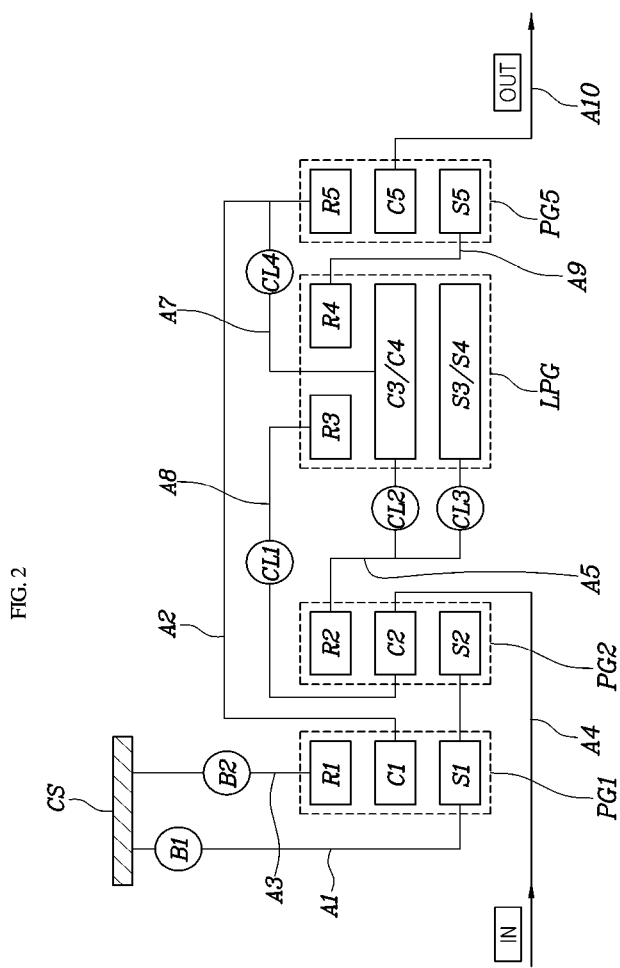
FIG. 2 schematically illustrates a structure of the vehicular multi-stage transmission according to another exemplary embodiment of the present disclosure.

Hereinafter, a vehicular multi-stage transmission according to an exemplary embodiment of the present disclosure will be described with reference to the accompanying drawings. FIG. 1 schematically illustrates a structure of a vehicular multi-stage transmission according to an exemplary embodiment of the present disclosure. FIG. 2 schematically illustrates a structure of the vehicular multi-stage transmission according to another exemplary embodiment of the present disclosure. FIG. 3 is an operation mode table of the vehicular multi-stage transmission according to an exemplary embodiment of the present disclosure.

First, referring to FIG. 1, a vehicular multi-stage transmission of the present disclosure may include: an input shaft (IN) and an output shaft (OUT); a first planetary gear set (PG1), a second planetary gear set (PG2), a third planetary gear set (PG3), a fourth planetary gear set (PG4), and a fifth planetary gear set (PG5), each of which is disposed between the input shaft (IN) and the output shaft (OUT) to be able to transfer a rotational force and has three rotation elements; and six gear-shifting elements connected to the rotation elements of the planetary gear sets.

A first rotation element (S1) of the first planetary gear set (PG1) may be fixedly connected (e.g., continuously connected) to a first rotation element (S2) of the second planetary gear set (PG2) and be selectively connected to a transmission case (CS) by one of the gear-shifting elements. A second rotation element (C1) of the first planetary gear set (PG1) may be fixedly connected to a third rotation element (R5) of the fifth planetary gear set (PG5). A third rotation element (R1) of the first planetary gear set (PG1) may be selectively connected (e.g., selectively connected) to the transmission case (CS) by another of the gear-shifting elements.

A second rotation element (C2) of the second planetary gear set (PG2) may be fixedly connected to the input shaft (IN) and selectively connected to a third rotation element (R3) of the third planetary gear set (PG3), and a third rotation element (R2) of the second planetary gear set (PG2) may be selectively connected to each of a first rotation element (S3) and a second rotation element (C3) of the third planetary gear set (PG3).

A first rotation element (S3) of the third planetary gear set (PG3) may be fixedly connected to a first rotation element (S4) of the fourth planetary gear set (PG4). The second rotation element (C3) of the third planetary gear set (PG3) may be fixedly connected to a second rotation element (C4) of the fourth planetary gear set (PG4) and selectively connected to the third rotation element (R5) of the fifth planetary gear set (PG5). A third rotation element (R4) of the fourth planetary gear set (PG4) may be fixedly connected to a first rotation element (S5) of the fifth planetary gear set (PG5). A second rotation element (C5) of the fifth planetary gear set (PG5) may be connected to the output shaft (OUT). The first planetary gear set (PG1), the second planetary gear set (PG2), the third planetary gear set (PG3), the fourth planetary gear set (PG4), and the fifth planetary gear set (PG5) may be successively arranged along an axial direction of the input shaft (IN) and the output shaft (OUT).

In the present disclosure, the first rotation element (S1) of the first planetary gear set (PG1) may be selectively connected to the transmission case (CS) by a first brake (B1) among the gear-shifting elements. The third rotation element (R1) of the first planetary gear set (PG1) may be selectively connected to the transmission case (CS) by a second brake (B2) among the gear-shifting elements. The remaining elements among the gear-shifting elements may be arranged to form a variable connection structure between the rotation elements of the planetary gear sets. In other words, the first brake (B1) and the second brake (B2) play a role of restraining or releasing the rotation of the first rotation element (S1) of the first planetary gear set (PG1) and the rotation of the third rotation element (R1) of the first planetary gear set (PG1), respectively.

A first clutch (CL1) among the gear-shifting elements may be installed to form a variable connection structure between the second rotation element (C2) of the second planetary gear set (PG2) and the third rotation element (R3) of the third planetary gear set (PG3). A second clutch (CL2) among the gear-shifting elements may be installed to form a variable connection structure between the third rotation element (R2) of the second planetary gear set (PG2) and the second rotation element (C3) of the third planetary gear set (PG3). A third clutch (CL3) among the gear-shifting elements may be installed to form a variable connection structure between the third rotation element (R2) of the second planetary gear set (PG2) and the first rotation element (S3) of the third planetary gear set (PG3). A fourth clutch (CL4) among the gear-shifting elements may be installed to form a variable connection structure between the second rotation element (C2) of the third planetary gear set (PG3) and the third rotation element (R5) of the fifth planetary gear set (PG5).

In the present exemplary embodiment, the first rotation element (S1), the second rotation element (C1), and the third rotation element (R1) of the first planetary gear set (PG1) correspond to a first sun gear, a first carrier, and a first ring gear, respectively; the first rotation element (S2), the second rotation element (C2), and the third rotation element (R2) of the second planetary gear set (PG2) correspond to a second sun gear, a second carrier, and a second ring gear, respectively; the first rotation element (S3), the second rotation element (C3), and the third rotation element (R3) of the third planetary gear set (PG3) correspond to a third sun gear, a third carrier, and a third ring gear, respectively; the first rotation element (S4), the second rotation element (C4), and the third rotation element (R4) of the fourth planetary gear set (PG4) correspond to a fourth sun gear, a fourth carrier, and a fourth ring gear, respectively; and the first rotation element (S5), the second rotation element (C5), and the third rotation element (R5) of the fifth planetary gear set (PG5) correspond to a fifth sun gear, a fifth carrier, and a fifth ring gear, respectively.

Meanwhile, as another exemplary embodiment, the third planetary gear set (PG3) and the fourth planetary gear set (PG4) may be arranged as a single complex planetary gear set having four rotation elements. In other words, as illustrated in FIG. 2, the complex planetary gear set (LPG) may include: a first rotation element (S3/S4) in which the first rotation elements of the third planetary gear set (PG3) and the fourth planetary gear set (PG4) may be coupled to each other, a second rotation element (C3/C4) in which the second rotation elements thereof may be coupled to each other, a third rotation element (R3); and a fourth rotation element (R4). The third rotation element (R3) and the fourth rotation element (R4) may be configured by the third rotation elements of the third planetary gear set (PG3) and the fourth planetary gear set (PG4), respectively. As described above, two planetary gear sets may be applied as one complex planetary gear set, and thus a volume package of an automatic transmission may be reduced.

The vehicular multi-stage transmission configured as described above may be described as follows. The vehicular multi-stage transmission may include: a first planetary gear set (PG1), a second planetary gear set (PG2), a third planetary gear set (PG3), a fourth planetary gear set (PG4), and a fifth planetary gear set (PG5), each of which has three rotation elements; six gear-shifting elements configured to selectively provide a frictional force; and ten rotational shafts connected to the rotation elements of the planetary gear sets.

A first rotational shaft (A1) may be directly connected to a first rotation element of the first planetary gear set (PG1) and a first rotation element of the second planetary gear set (PG2). A second rotational shaft (A2) may be directly connected to (e.g., connected in series) a second rotation element of the first planetary gear set (PG1) and a third rotation element of the fifth planetary gear set (PG5). A third rotational shaft (A3) may be directly connected to a third rotation element of the first planetary gear set (PG1). A fourth rotational shaft (A4) is an input shaft (IN) directly connected to a second rotation element of the second planetary gear set (PG2). A fifth rotational shaft (A5) may be directly connected to a third rotation element of the second planetary gear set (PG2). A sixth rotational shaft (A6) may be directly connected to a first rotation element of the third planetary gear set (PG3) and a first rotation element of the fourth planetary gear set (PG4). A seventh rotational shaft (A7) may be directly connected to a second rotation element of the third planetary gear set (PG3) and a second rotation element of the fourth planetary gear set (PG4). An eighth rotational shaft (A8) may be directly connected to a third rotation element of the third planetary gear set (PG3). A ninth rotational shaft (A9) may be directly connected to a third rotation element of the fourth planetary gear set (PG4) and a first rotation element of the fifth planetary gear set (PG5). A tenth rotational shaft (A10) may be an output shaft (OUT) directly connected to a second rotation element of the fifth planetary gear set (PG5).

A first clutch (CL1) among the six gear-shifting elements may be installed between the fourth rotational shaft (A4) and the eighth rotational shaft (A8), a second clutch (CL2) may be installed between the fifth rotational shaft (A5) and the seventh rotational shaft (A7), a third clutch (CL3) may be installed between the fifth rotational shaft (A5) and the sixth rotational shaft (A6), a fourth clutch (CL4) may be installed between the second rotational shaft (A2) and the seventh rotational shaft (A7), a first brake (B1) may be installed between the first rotational shaft (A1) and the transmission case (CS), and a second brake (B2) may be installed between the third rotational shaft (A3) and the transmission case (CS).

In particular, the first clutch (CL1) may be installed to selectively connect the second rotation element of the second planetary gear set (PG2) and the third rotation element of the third planetary gear set (PG3). The second clutch (CL2) may be installed to selectively connect the third rotation element of the second planetary gear set (PG2) and the second rotation element of the third planetary gear set (PG3). The third clutch (CL3) may be installed to selectively connect the third rotation element of the second planetary gear set (PG2) and the first rotation element of the third planetary gear set (PG3). The fourth clutch (CL4) may be installed to selectively connect the second rotation element of the third planetary gear set (PG3) and the third rotation element of the fifth planetary gear set (PG5).

A vehicular multi-stage transmission made in a structure as described above may change the speed and direction of rotation of rotation elements, which configure five planetary gear sets, through a selective control operation of a clutch and a brake, to perform gear shifting. Therefore, the vehicular multi-stage transmission is capable of having a gear ratio of twelve forward stages and one reverse stage, implemented through the above-described gear shifting operation, to allow a vehicle to operate or be driven. Further, a combination of three planetary gear sets and one complex planetary gear set allows the vehicular multi-stage transmission to have a gear ratio of twelve forward stages and one reverse stage, thus reducing the volume package of an automatic transmission. Therefore, the vehicular multi-stage transmission is capable of improving fuel efficiency by multi-staging the gear shifting stage of an automatic transmission and enhancing the quiet operation of a vehicle by using an engine operation point at a low RPM band.

The present disclosure has been made with reference to only particular exemplary embodiments. However, it would be obvious to a person skilled in the alt that various modifications and changes are possible within the technical idea of the present disclosure, provided by the accompanying claims.

What is claimed is:
1. A vehicular multi-stage transmission, comprising:
an input shaft (IN) and an output shaft (OUT);
a first planetary gear set (PG1), a second planetary gear set (PG2), a third planetary gear set (PG3), a fourth planetary gear set (PG4), and a fifth planetary gear set (PG5), each of which is disposed between the input shaft (IN) and the output shaft (OUT) to transfer a rotational force, wherein each planetary gear set includes three rotation elements; and
at least six gear-shifting elements connected to the rotation elements of the planetary gear sets,
wherein a first rotation element of the first planetary gear set (PG1) is fixedly connected to a first rotation element of the second planetary gear set (PG2) and selectively connected to a transmission case (CS) by a first of the gear-shifting elements, a second rotation element of the first planetary gear set (PG1) is fixedly connected to a third rotation element of the fifth planetary gear set (PG5), and a third rotation element of the first planetary gear set (PG1) is selectively connected to the transmission case (CS) by a second of the gear-shifting elements;
wherein a second rotation element of the second planetary gear set (PG2) is fixedly connected to the input shaft (IN) and selectively connected to a third rotation element of the third planetary gear set (PG3), and a third rotation element of the second planetary gear set (PG2) is selectively connected to each of a first rotation element and a second rotation element of the third planetary gear set (PG3);
wherein a first rotation element of the third planetary gear set (PG3) is fixedly connected to a first rotation element of the fourth planetary gear set (PG4), and the second rotation element of the third planetary gear set (PG3) is fixedly connected to a second rotation element of the fourth planetary gear set (PG4) and selectively connected to the third rotation element of the fifth planetary gear set (PG5);
wherein a third rotation element of the fourth planetary gear set (PG4) is fixedly connected to a first rotation element of the fifth planetary gear set (PG5), and wherein a second rotation element of the fifth planetary gear set (PG5) is fixedly connected to the output shaft (OUT).

2. The vehicular multi-stage transmission of claim 1, wherein
the first rotation element of the first planetary gear set (PG1) is selectively connected to the transmission case (CS) by a first brake (B1) among the gear-shifting elements,
the third rotation element of the first planetary gear set (PG1) is selectively connected to the transmission case (CS) by a second brake (B2) among the gear-shifting elements, and
remaining gear-shifting elements among the gear-shifting elements are arranged to selectively connect the rotation elements of the planetary gear sets.

3. The vehicular multi-stage transmission of claim 2, wherein
a first clutch (CL1) among the gear-shifting elements is disposed between the second rotation element of the second planetary gear set (PG2) and the third rotation element of the third planetary gear set (PG3),
a second clutch (CL2) among the gear-shifting elements is disposed between the third rotation element of the second planetary gear set (PG2) and the second rotation element of the third planetary gear set (PG3),
a third clutch (CL3) among the gear-shifting elements is disposed between the third rotation element of the second planetary gear set (PG2) and the first rotation element of the third planetary gear set (PG3), and
a fourth clutch (CL4) among the gear-shifting elements is disposed between the second rotation element of the third planetary gear set (PG3) and the third rotation element of the fifth planetary gear set (PG5).

4. The vehicular multi-stage transmission of claim 1, wherein the third planetary gear set (PG3) and the fourth planetary gear set (PG4) are arranged as a complex planetary gear set having four rotation elements.

5. A vehicular multi-stage transmission, comprising:
a first planetary gear set (PG1), a second planetary gear set (PG2), a third planetary gear set (PG3), a fourth planetary gear set (PG4), and a fifth planetary gear set (PG5), each of which has three rotation elements;
six gear-shifting elements configured to selectively provide a frictional force; and
ten rotational shafts connected to the rotation elements of the planetary gear sets,
wherein a first rotational shaft (A1) is directly connected to a first rotation element of the first planetary gear set (PG1) and a first rotation element of the second planetary gear set (PG2);
wherein a second rotational shaft (A2) is directly connected to a second rotation element of the first planetary gear set (PG1) and a third rotation element of the fifth planetary gear set (PG5);
wherein a third rotational shaft (A3) is directly connected to a third rotation element of the first planetary gear set (PG1);

wherein a fourth rotational shaft (A4) is an input shaft (IN) directly connected to a second rotation element of the second planetary gear set (PG2);
wherein a fifth rotational shaft (A5) is directly connected to a third rotation element of the second planetary gear set (PG2);
wherein a sixth rotational shaft (A6) is directly connected to a first rotation element of the third planetary gear set (PG3) and a first rotation element of the fourth planetary gear set (PG4);
wherein a seventh rotational shaft (A7) is directly connected to a second rotation element of the third planetary gear set (PG3) and a second rotation element of the fourth planetary gear set (PG4);
wherein an eighth rotational shaft (A8) is directly connected to a third rotation element of the third planetary gear set (PG3);
wherein a ninth rotational shaft (A9) is directly connected to a third rotation element of the fourth planetary gear set (PG4) and a first rotation element of the fifth planetary gear set (PG5);
wherein a tenth rotational shaft (A10) is an output shaft (OUT) directly connected to a second rotation element of the fifth planetary gear set (PG5), and
wherein a fast clutch (CL1) among the six gear-shifting elements is installed between the fourth rotational shaft (A4) and the eighth rotational shaft (A8), a second clutch (CL2) is installed between the fifth rotational shaft (A5) and the seventh rotational shaft (A7), a third clutch (CL3) is installed between the fifth rotational shaft (A5) and the sixth rotational shaft (A6), a fourth clutch (CL4) is installed between the second rotational shaft (A2) and the seventh rotational shaft (A7), a first brake (B1) is installed between the first rotational shaft (A1) and the transmission case (CS), and a second brake (B2) is installed between the third rotational shaft (A3) and the transmission case (CS).

6. The vehicular multi-stage transmission of claim 5, wherein
the first clutch (CL1) is installed to selectively connect the second rotation element of the second planetary gear set (PG2) and the third rotation element of the third planetary gear set (PG3),
the second clutch (CL2) is installed to selectively connect the third rotation element of the second planetary gear set (PG2) and the second rotation element of the third planetary gear set (PG3),
the third clutch (CL3) is installed to selectively connect the third rotation element of the second planetary gear set (PG2) and the first rotation element of the third planetary gear set (PG3), and
the fourth clutch (CL4) is installed to selectively connect the second rotation element of the third planetary gear set (PG3) and the third rotation element of the fifth planetary gear set (PG5).

7. The vehicular multi-stage transmission of claim 5, wherein the third planetary gear set (PG3) and the fourth planetary gear set (PG4) are arranged as a complex planetary gear set having four rotation elements.

* * * * *